(12) United States Patent
Henriksen

(10) Patent No.: US 7,438,504 B2
(45) Date of Patent: Oct. 21, 2008

(54) ARRANGEMENT FOR ANCHORING A FLOATING STRUCTURE

(75) Inventor: Svein Dag Henriksen, Harstad (NO)

(73) Assignee: Hydra Tidal Energy Technology AS, Narstad (NO)

( * ) Notice: Subject to any disclaimer, the term of this patent is extended or adjusted under 35 U.S.C. 154(b) by 354 days.

(21) Appl. No.: 10/557,014

(22) PCT Filed: May 18, 2004

(86) PCT No.: PCT/NO2004/000148

§ 371 (c)(1),
(2), (4) Date: Nov. 15, 2005

(87) PCT Pub. No.: WO2004/104411

PCT Pub. Date: Dec. 2, 2004

(65) Prior Publication Data

US 2006/0269362 A1    Nov. 30, 2006

(30) Foreign Application Priority Data

May 21, 2003   (NO) .................................. 20032295

(51) Int. Cl.
B63B 35/44    (2006.01)

(52) U.S. Cl. ..................... 405/223.1; 405/224; 114/264

(58) Field of Classification Search ................. 405/224, 405/223.1; 114/264–266
See application file for complete search history.

(56) References Cited

U.S. PATENT DOCUMENTS

| 3,961,490 | A | * | 6/1976 | Corgnet | 405/224 |
| 4,066,031 | A | * | 1/1978 | Corgnet | 405/224 |
| 4,604,001 | A | * | 8/1986 | Wetmore | 405/224 |
| 4,864,152 | A |   | 9/1989 | Pedersen | |
| 5,476,059 | A |   | 12/1995 | Pollack | |
| 2003/0206772 | A1 | * | 11/2003 | Horne et al. | 405/224 |
| 2007/0003375 | A1 | * | 1/2007 | Knutsen et al. | 405/224 |

FOREIGN PATENT DOCUMENTS

| JP | 59032579 | 2/1984 |
| WO | WO03/006825 | 1/2003 |

* cited by examiner

*Primary Examiner*—Frederick L Lagman
(74) *Attorney, Agent, or Firm*—Harness, Dickey & Pierce, PLC

(57) ABSTRACT

An arrangement for anchoring a floating structure comprising a mooring boom 120a, b; 650a, b pivotally arranged at either end, wherein each mooring boom at its free end has a bushing 124a, b: 654a, b through which anchor chains or wires can run. The anchor chain that runs through one of the bushings is fastened to the opposite end of the structure. In addition, for reasons of stability there may be tensioned lines which connect the free ends of both mooring booms to the structure.

22 Claims, 11 Drawing Sheets

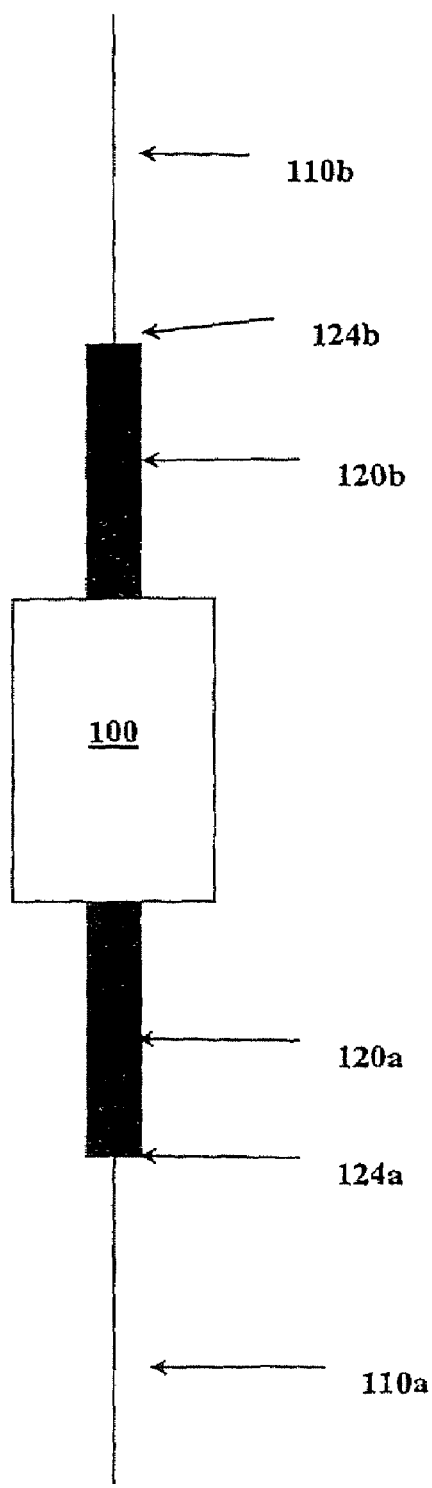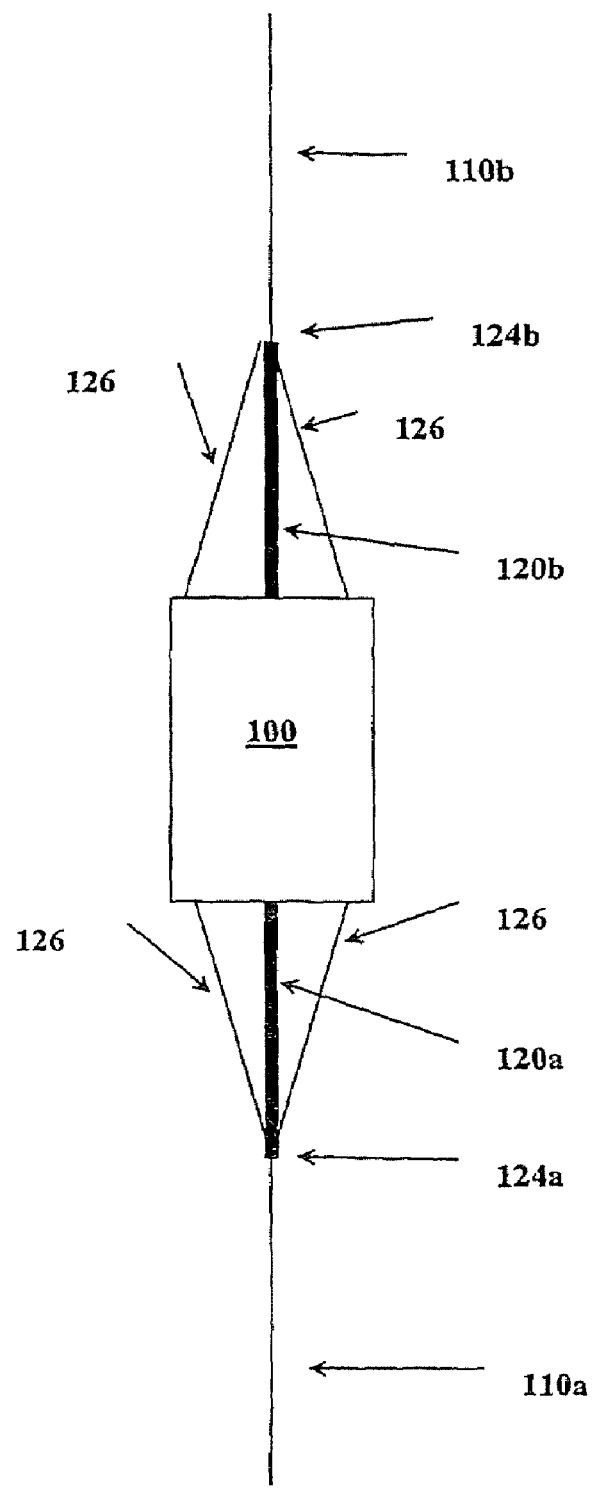
Figure 9a
Figure 9b

ARRANGEMENT FOR ANCHORING A FLOATING STRUCTURE

The invention relates to mooring systems for floating structures. More specifically, the invention relates to a self-adjusting arrangement for equilibrium mooring of a floating structure that is anchored in water with predictable current directions, for example, tidal currents or the run of a river. The invention can therefore be used for anchoring, for example, a tidal power station.

One example of a floating plant for the generation of electric power from (low velocity) water currents is described in U.S. Pat. No. 4,864,152. This plant is designed to be able to swing freely about a mooring bitt that is secured to the seabed.

Another example of a floating power station is discussed in the Applicant's own international patent application PCT/NO02/00249 (filed on 8 Jul. 2002, published on 23 Jan. 2003 as WO 03/006825 A1). This plant comprises a platform equipped with a plurality of buoyancy elements, preferably one in each corner of the platform. This ensures that the requirement of stability, both sideways and longitudinal, with a minimum of displacement is met. A plurality of supporting arms extend from the platform to each side, each one supporting a generator housing. The supporting arms are hinged at their point of attachment to the platform.

The arrangement permits standard and known anchoring using anchor (not shown) and chain in both directions. Either one or two anchors in each direction, or one anchor in each direction holds two platforms. This means that platforms can be anchored in the longitudinal direction at a desired distance, and at such proximity to each other that turbines run clear of each other. When several units are anchored side by side, the lateral distance will also be capable of being adjusted/secured by means of chains.

Production load from turbines is used for pull-up of anchors in each direction. Slack on the chain on the opposite side of the anchor load is winched in and when the water current turns, the same happens again on the opposite side. In this way, a secure and stable position can be obtained when the current moves in two directions.

During the operation of a floating tidal power station, the floating structure is exposed to substantial forces and moments because of the production load from the turbines. In particular, the trimming moment of the structure could be substantial Rules issued by classification companies require the length of an anchor chain (between the anchor and the floating structure) to be so long that the chain cannot lifted from the bottom by the anchor. In a typical floating power station, the sum of the forces that arise (production load, initial tension in the same direction and drag) could result in as much as 200 tonnes of tension being produced on extraction of about 1.5 MW in a water current of 6 knots.

To counter such moments and ensure that the floating structure is held in a desired position, an active use of the plant's anchor winches is required. However, in practice it has been found to be very difficult to counter such moments and resulting motions. This is a clear limitation of known plants.

U.S. Pat. No. 5,061,131 discusses a "self-righting" mooring system for a floating platform. This document teaches a platform anchored using anchor chains running to respective anchors on the seabed. Each anchor chain is equipped with a weight which in a normal state is situated above the seabed. When subjected to forces (e.g., water current, wind), the platform will move. The weight on the anchor chain on the leeward side will move towards the bottom. According to the description, when the weight rests on the bottom, this causes a great and immediate increase in the restoring forces of the platform.

There is therefore a need for a mooring system that does not cause substantial trim (or pitching) of the floating platform; that ensures stable positioning with little drift and reduces the distance between the anchor and the floating structure.

The invention solves these problems as it provides a mooring system where moments (e.g., generated by production load from turbines) are offset by a restraining system, mooring booms and tensile load on the anchor chain.

Accordingly, there is provided an arrangement for anchoring a floating structure comprising first and second ends, wherein the arrangement is characterised in that the structure at each of said ends is provided with at least one downward projecting rigid mooring boom; wherein the mooring boom that is connected to the first end of the structure comprises, at its free end, means for guiding an elongate mooring element which at one end thereof can be connected to the second end of the structure; and wherein the mooring boom that is connected to the second end of the structure comprises, at its free end, means for guiding an elongate mooring element which at one end thereof can be connected to the first end of the structure.

Preferred embodiments of the invention are disclosed in dependent claims 2-11.

One embodiment of the present invention will now be described in further detail with reference to the attached drawings, where like parts have been given like reference numerals.

FIG. 9a is a schematic diagram of the arrangement according to the invention shown from above, without stabilising stay cables.

FIG. 9b shows the arrangement in FIG. 9a, with stabilising stay cables.

Figure 8A:
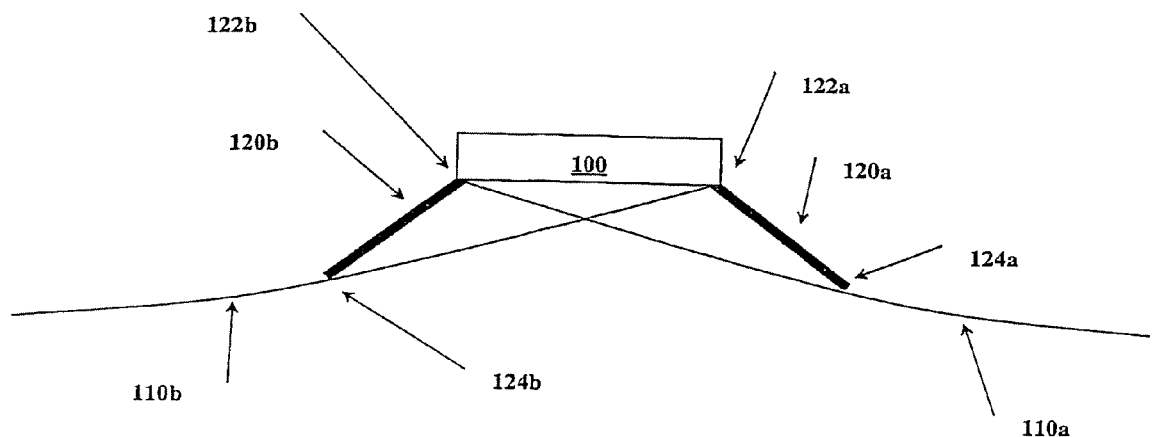
FIG. 8a is a schematic diagram of the arrangement according to the invention shown from one side, floating in a still body of water.

The arrangement according to the invention consists in its most basic form of a floating structure 100, preferably an elongate structure with first and second ends as shown in FIG. 8a. A mooring boom 120a, b is fastened at each end of the floating structure.

Figure 10A:
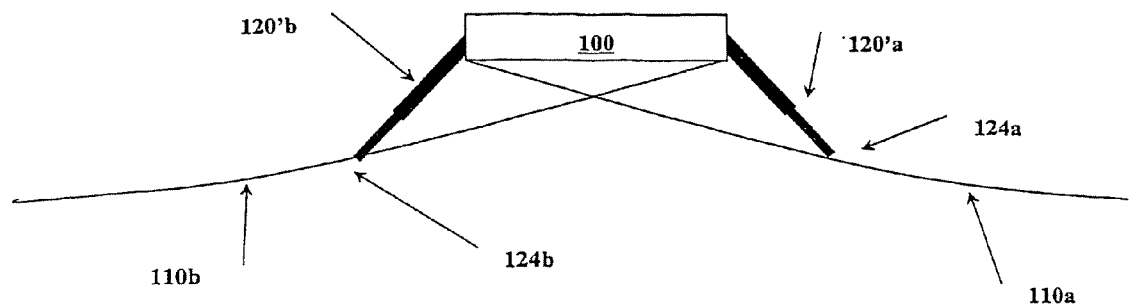
FIG. 10a is a schematic diagram of the arrangement according to the invention equipped with telescopic mooring booms, shown from one side, floating in a still body of water.
Figure 10B:
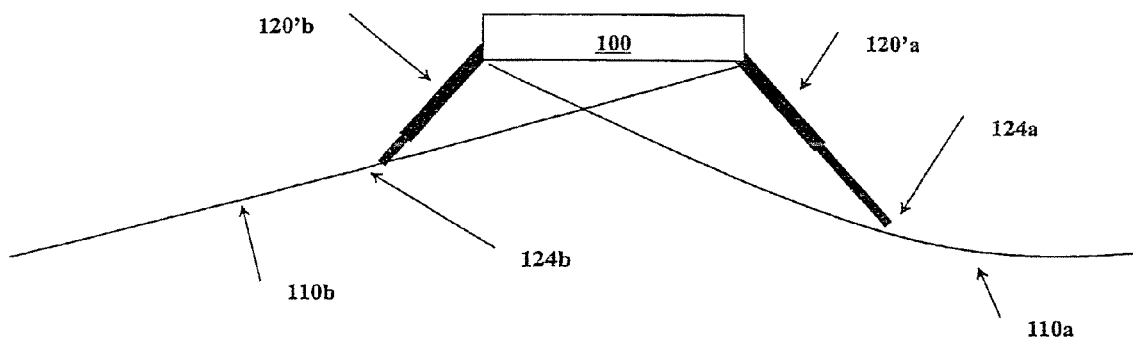
FIG. 10b shows the arrangement in FIG. 10a, in a position as a consequence of a water current from the left-hand side of the figure.

The mooring booms are preferably pivotally attached to the structure about respective centres of rotation 122a, b. Each mooring boom has at its free end a bushing 124a, b through which a wire, chain or the like can run. Such a wire, chain or the like (hereinafter called mooring element) may be anchored to, e.g., a seabed (not shown). Each of the bushings 124a, b is designed to be able to guide respective mooring elements therethrough for attachment to opposite sides of the structure. As can be seen from the figures, one of the mooring elements 10a runs through the sleeve 124a and up to the end of the structure that is opposite the end to which the mooring boom 120a is attached. The same is the case for the mooring element 124b. As mentioned, each mooring boom is preferably pivotally attached to the floating structure, but the mooring booms may also comprise telescopic elements (including springs and dampers) which permit a compression and extension of said mooring boom instead of a pivotal attachment to the structure. One example is shown in FIGS. 10a and 10b.

Figure 8B:
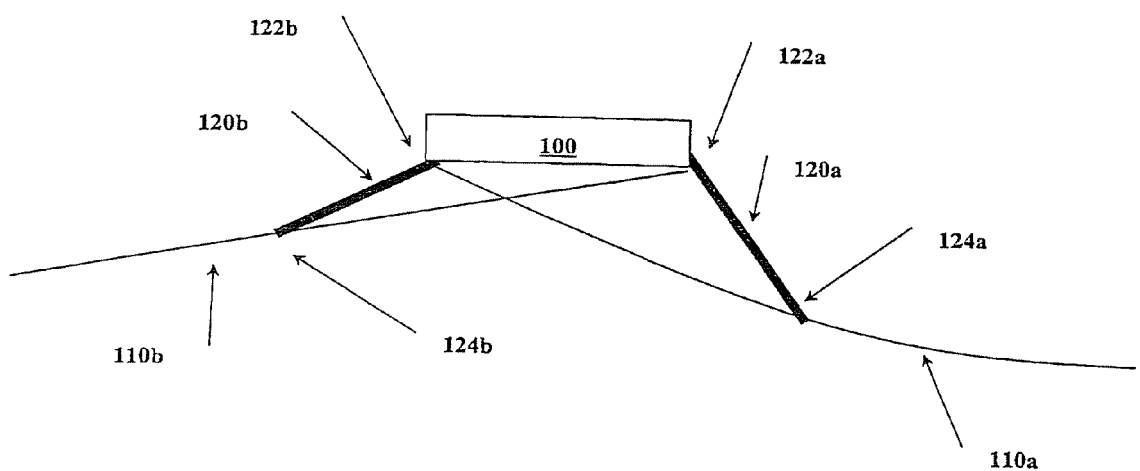
FIG. 8b shows the arrangement in FIG. 8a, in a position as a consequence of a water current from the left-hand side of the figure.
Figure 11A:
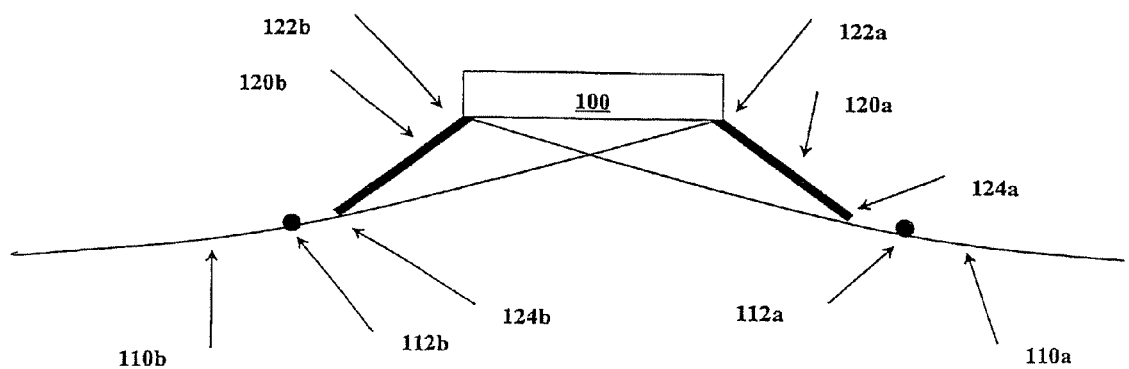
FIG. 11a is a schematic diagram of the arrangement according to the invention equipped with stop means, shown from one side, floating in a still body of water.
Figure 11B:
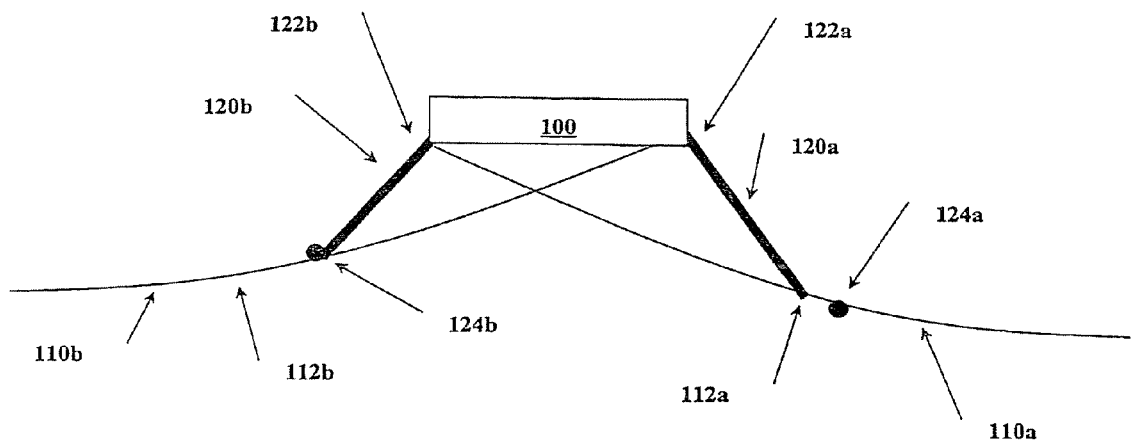
FIG. 11b shows the arrangement in FIG. 11a in a position as a consequence of a water current from the left-hand side of the figure.

As mentioned, the plant or the structure has at both ends a preferably pivotal mooring boom, wherein each mooring boom has at its free end a sleeve or bushing through which chains can run as shown in the figures. The anchor chain or the wire that runs through one of the bushings is fastened to the opposite end of the plant. In addition, for reasons of stability, it is advantageous to have tensioned lines 126 that connect the free ends of both mooring booms to the plant. FIGS. 8b, 10b and 11b show different embodiments of the invention as installed in a water current envisaged as coming from the left-hand side of the figure. At both ends of the structure there extends a main chain (elongate mooring element) in the direction of the water current. As shown, these mooring elements will run out from the "aft end" of the object and be passed forwards in the centre line beneath the structure through the sleeve 124a, b, which in turn is fastened to the free end of the mooring boom as mentioned above. This mooring boom will, in the "load direction", remain at an angle of almost 45° to the structure.

The mooring boom can absorb pressure loads, is preferably hinged to the end of the structure and equipped with tensioned lines running from the bushing or sleeve at the lower end to each side of the structure. The length and weight of the mooring boom is adapted such that moments causing and preventing trim will be equally great in both trim directions. In this way, a self-adjusting "trim balance" in all moments acting on the structure will be obtained.

The mooring boom can turn freely about its centre of rotation 122a, b, preferably with taut side stays 126, and function like a "deadman" on the anchor chain (a weight that tautens a non-vertical chain). This is particularly useful on the opposite side of the main pull and ensures an optimum stable positioning. When the water current turns, the function of the mooring booms will automatically be switched. A method is also envisaged which, once it has been determined precisely where the object is to be positioned, involves the depth and the topography of the bottom determining where the actual anchors are to be placed. The anchors are set out using anchor handling vessels, and the chain is laid out in the direction of the object's location. Before the chain end is released, the anchor is pulled up, and a cable with a buoyancy element at the end of the chain (for later raising) is released. The same procedure is repeated for anchor number 2. When the actual plant is to be deployed, the buoyancy elements are fished up, passed through the sleeve on the mooring boom 120a, b and guided in towards the structure. The chain is first pulled in on a hydraulic chain stopper 130a, b, and then the hydraulic hoisting apparatus is used to pull in the chain. A final hoisting and fastening of the anchor can be done using the plant turbines when the water current is sufficiently great.

Figure 1:
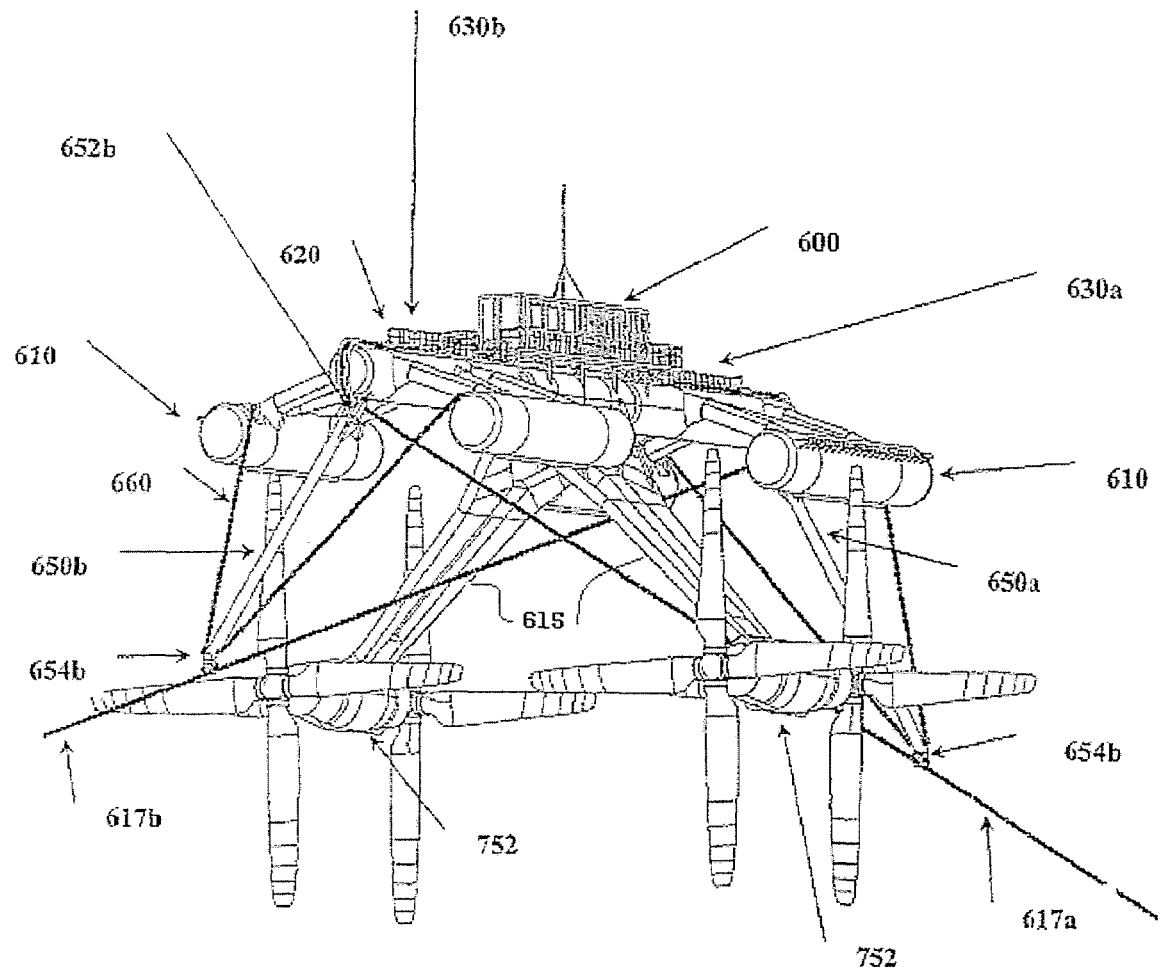
FIG. 1 is a perspective view of an embodiment of the arrangement according to the invention, in a plant for the generation of power from water currents.

FIG. 1 shows an embodiment of the invention where the supporting structure 620 is equipped with a control room 600 and supporting arms 615 connected to generators 752 for the generation of electric power from low velocity water currents. The supporting arms 615 are pivotally connected to the structure 620, as mentioned in the Applicant's patent application PCT/NO/02/00239 (referred to above). As shown in FIG. 1, the structure 620 is provided with pairs of float elements 610, preferably at the first and second ends of the structure. FIG. 1 also shows points of attachment 630a, b and the hydraulic adjusting apparatus that is necessary for pulling in and adjusting the mooring elements. As mentioned, the mooring booms 650a, b extend obliquely down from the structure, and FIG. 1 shows an embodiment wherein these are pivotally attached to the structure at respective points of rotation 652a, b. Each of the free ends of the mooring booms is equipped with bushings or sleeves 654a, b which are preferably pivotally attached to the mooring booms. A stabilising effect is obtained by tensioned lines 660 running from the free ends of the mooring booms up to each of the float elements 610, as shown in FIG. 1.

Figure 2:
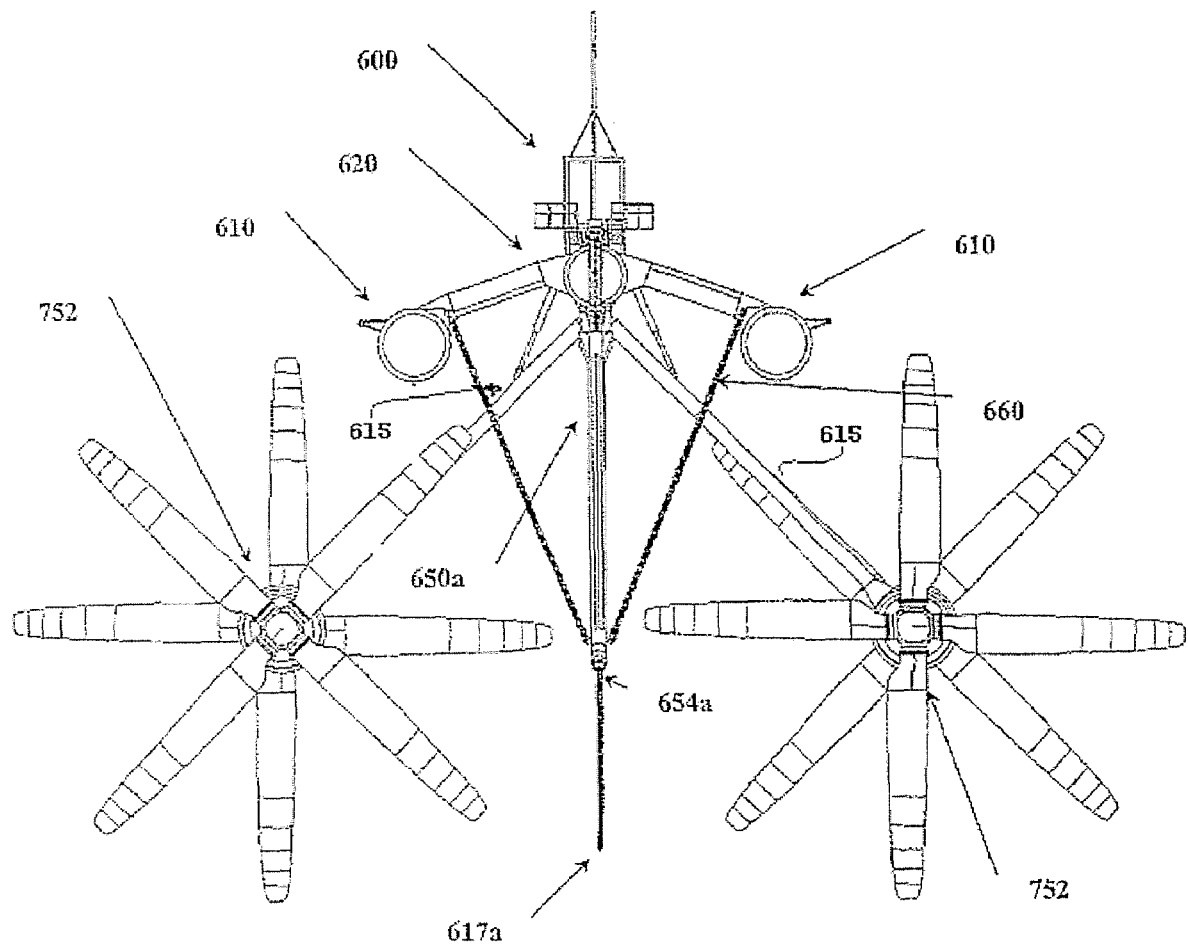
FIG. 2 shows the arrangement in FIG. 1, seen from one end.

FIG. 2, which shows the same arrangement as FIG. 1, but seen from one end, shows that the tensioned lines 660 may in fact be chains.

Figure 3:
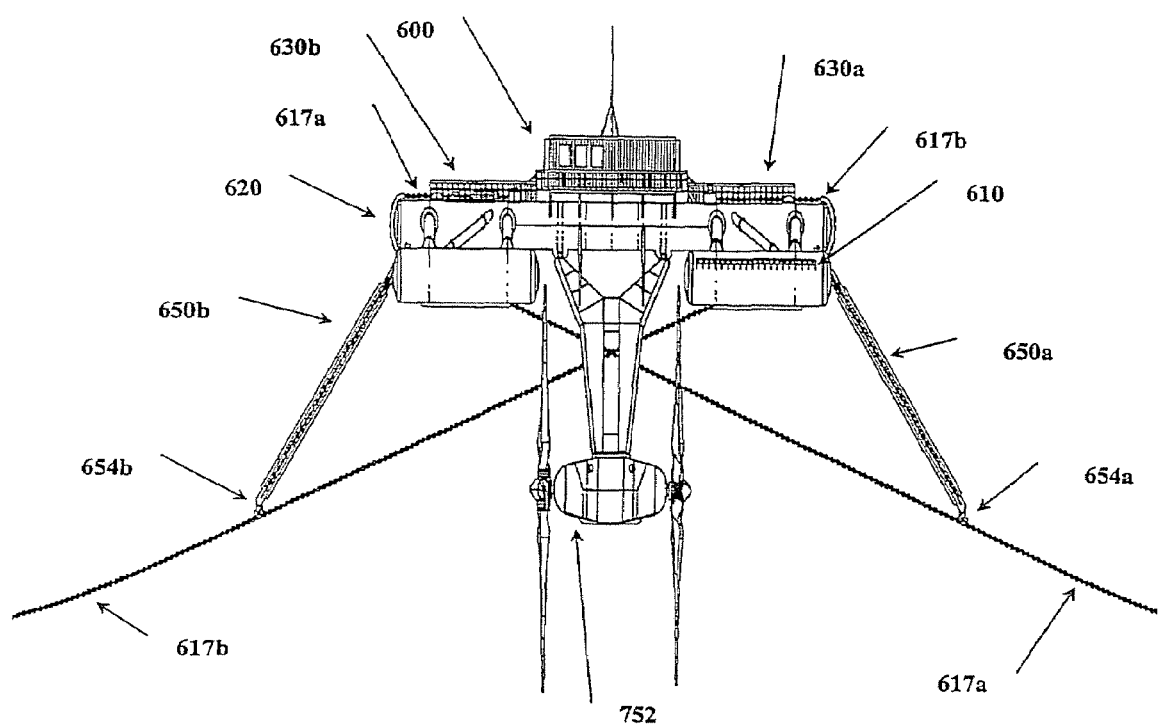
FIG. 3 shows the arrangement in FIG. 1, seen from one side.
Figure 4:
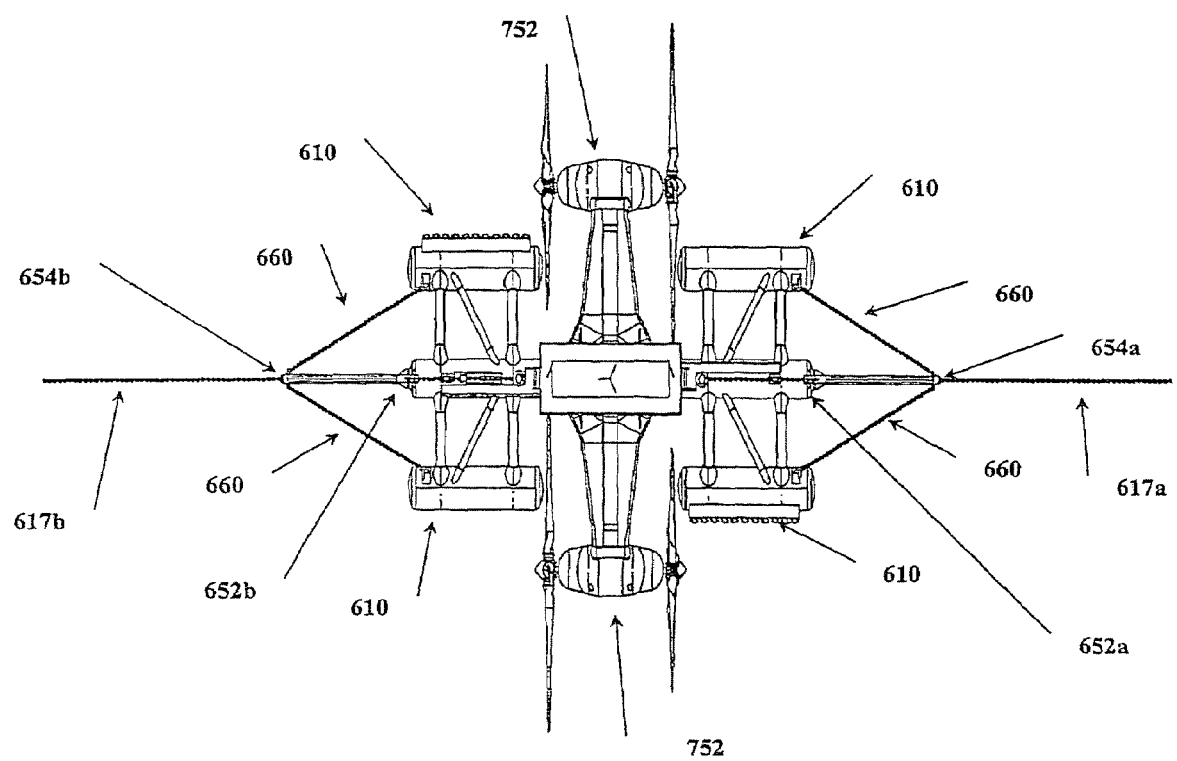
FIG. 4 shows the arrangement in FIG. 1, seen from above.

FIG. 3 also shows the points of attachment 630a, b, and the mooring elements 617a, b which run onto the upper side of the structure, shown in this figure to run around the ends of the structure. The figure also shows that the float elements 610 are mounted such that the support structure 620 will not normally be in contact with the water, but the invention will not be limited to such a structure. It will be noted that FIGS. 1-4 show an embodiment of the invention installed in a body of water, but a still body of water, i.e., the structure is not subjected to currents in any direction.

Figure 5:
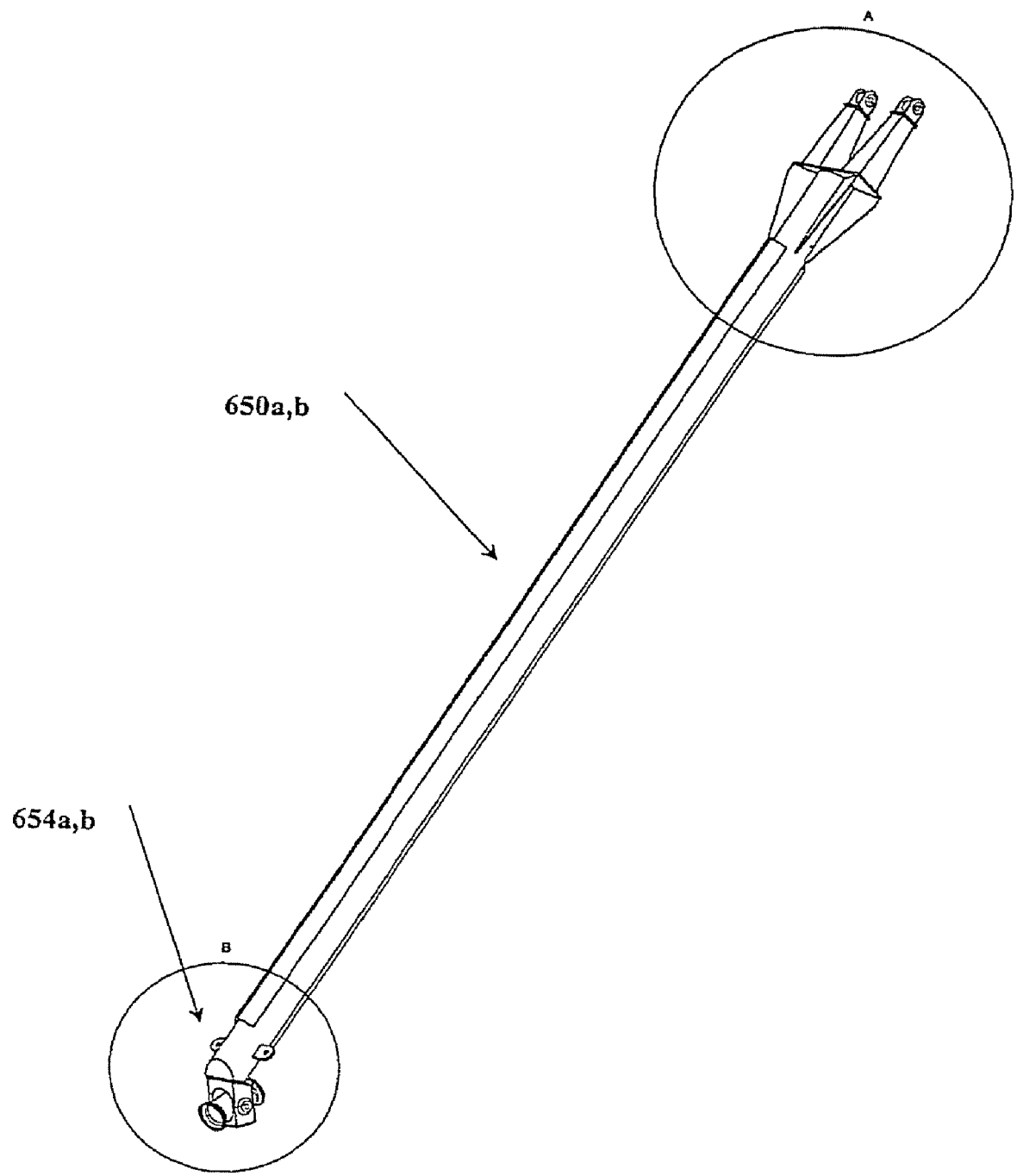
FIG. 5 is a perspective view of an embodiment of the mooring boom.

FIG. 5 shows an embodiment of the mooring boom 650a, b and discloses details of the ends of the mooring boom.

Figure 6:
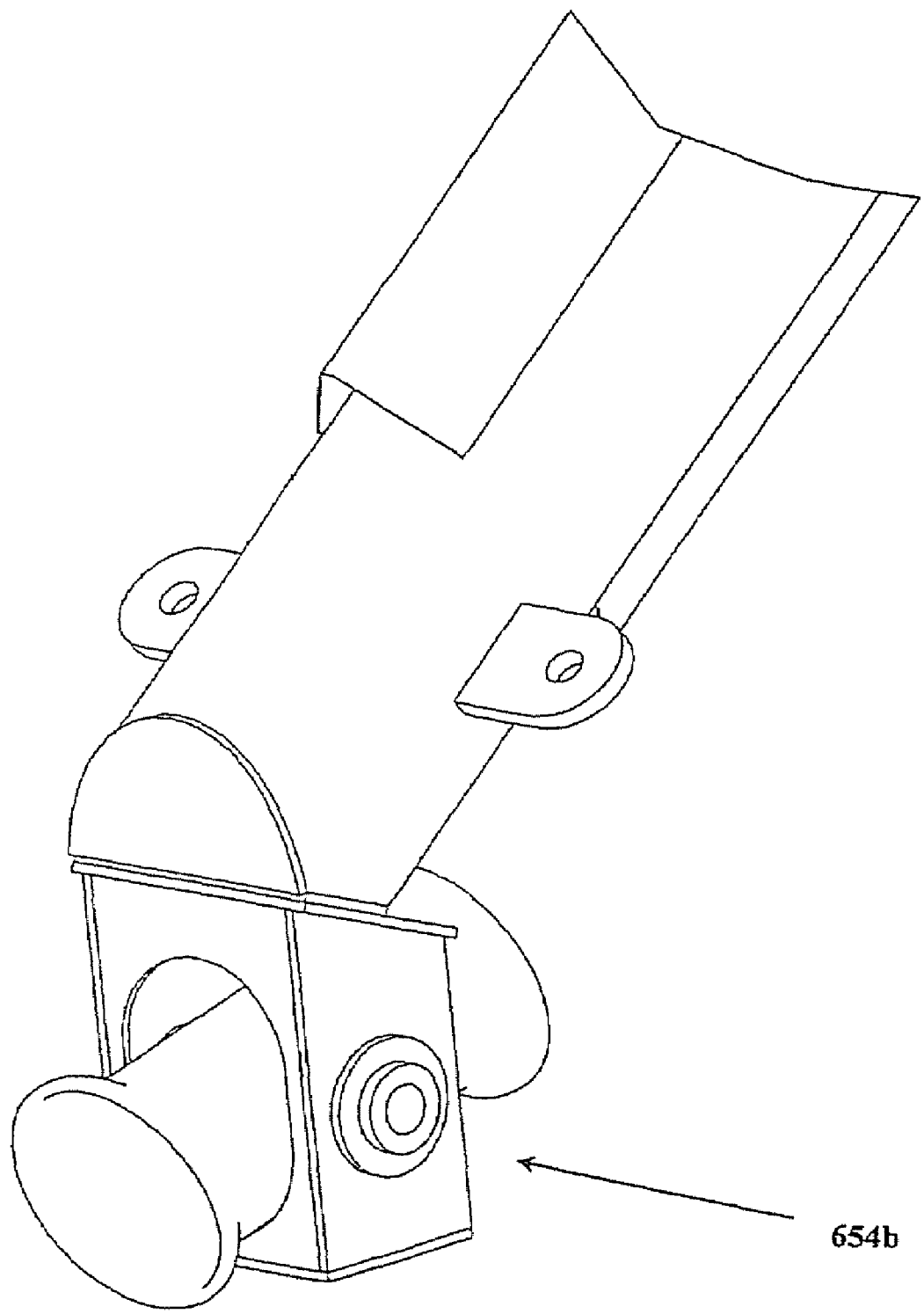
FIG. 6 is an enlarged view of the area marked B in FIG. 5, and shows the bushing at the free end of the boom.

FIG. 6 shows an embodiment of a bushing 654, and shows that this can be pivotally attached to the mooring boom.

Figure 7:
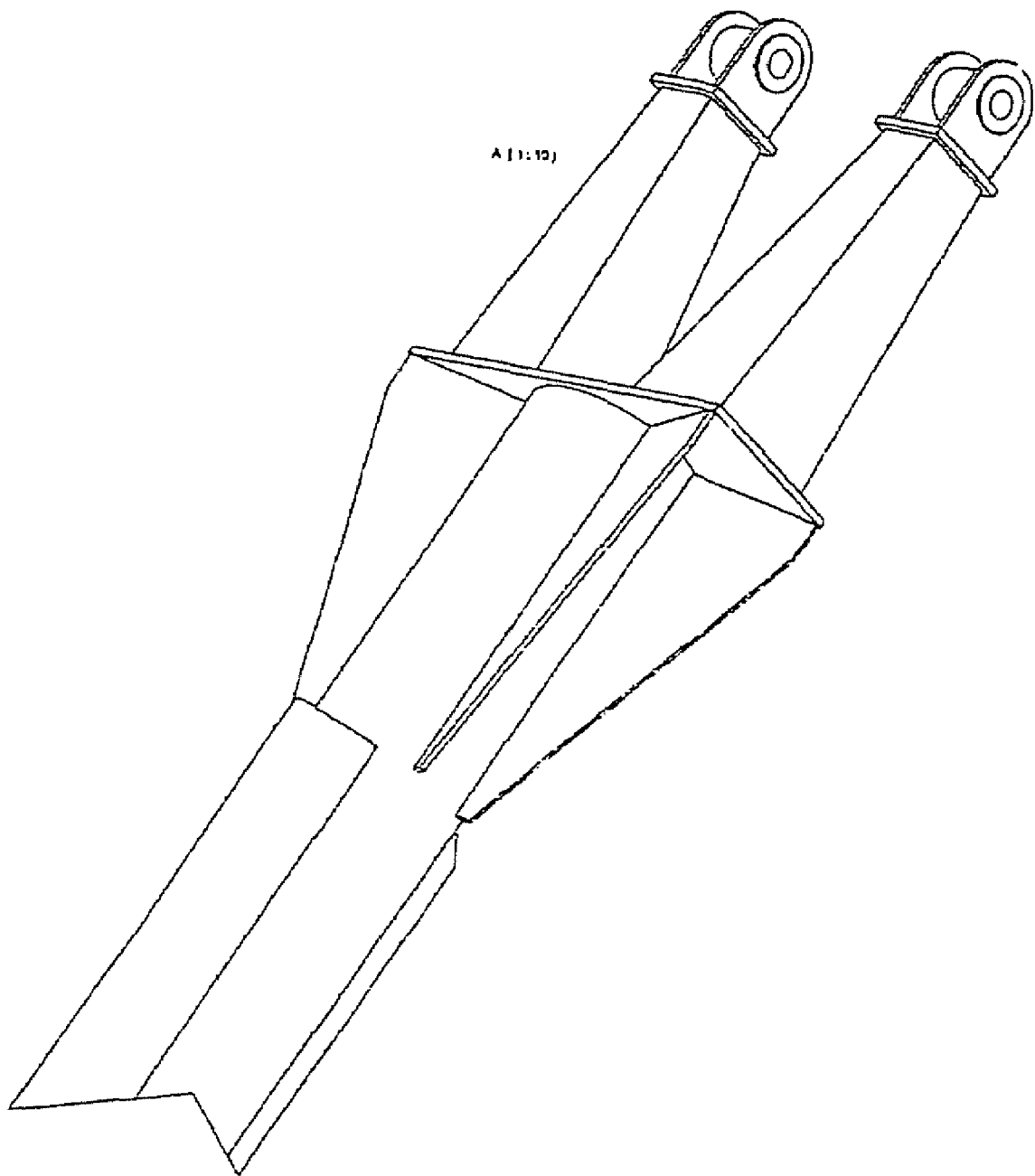
FIG. 7 is an enlarged view of the area marked A in FIG. 5, and shows the pivotal fastening for the structure.

FIG. 7 is an example of how the mooring boom can be connected to the centre of rotation 652a, b on the structure.

FIGS. 8a to 11b inclusive show the arrangement according to the invention in a more basic form. As already mentioned, FIG. 8a shows a basic floating structure 100 with two mooring booms 120a, b connected thereto, each guiding mooring elements (i.e., chains or wires). FIG. 8a shows the arrangement according to the invention installed in a still body of water, where the mooring elements 110a, b run out to each side and are assumed to be anchored to, for example, anchors on a seabed. FIG. 8b shows the same installation as that shown in FIG. 8a in a position as a consequence of a water current from the left-hand side of the figure. Here, it can be seen that the mooring boom 120b move a small distance upwards as a result of the tension on the mooring element 110b, whilst the mooring boom 120a is forced downwards. Both mooring booms 120a, b rotate about their respective centre of rotation 122a, b.

FIG. 9a shows an embodiment of the mooring booms 120a, b. In principle, the mooring booms can be large, rigid elements, but in practice (as also shown in the aforementioned figures), the mooring booms 120a, b are as shown in FIG. 9b, in which case it is advantageous to have tensioned lines or tensioned members 126 as shown.

FIGS. 10a and 10b show a variant of the arrangement according to the invention wherein the mooring booms 120'a, b are telescopic. A person versed in the art will understand that these mooring booms may be rigidly fixed to the structure 100, or pivotally attached as described above. Like the earlier figures, FIG. 10b shows the arrangement in FIG. 10a in a position as a consequence of a water current from the left-hand side of the figure.

To control the moment arm, the mooring elements 110a, b can be equipped with respective stops 112a, b on the outside of the respective mooring booms 120a, b. These stops will come into engagement with the free end of their respective mooring booms, as shown in FIG. 11b where the structure 100, as a consequence of a water current from the left-hand side of the figure, is forced towards the right, whereupon the stop 112a comes into engagement with the bushing 124a and thus restricts the motion of the whole plant. A stop of this kind on the mooring line at a given point (i.e., the angle of the mooring boom to the structure) may be advantageous. It will increase the moment that prevents trim. In practice, the way in which chains are fastened to the platform (at the opposite end of that known) and passed through the sleeve at the end of the mooring boom that projects far in front of the actual platform, means that the structure (the plant) as a whole will be located behind this point in the load direction. The reason is that the same lower point on the mooring boom (at the bushing through which the mooring element slides) is maintained in a sideways position by two chains close to the surface, and which are hinged at the same point as the upper end of the boom. For example, the whole plant will "spin around" if one of the mooring elements breaks. Another positive factor is that when the water current increases, the pressure of the water current on the mooring boom will also increase, so that the boom is forced down and counters trim in that the "point of attachment" comes lower. The relationship between the length of the boom and that it is filled with sand to increase its weight, is a relationship that can best be adjusted by practical tests. The ideal length, weight, angle of inclination etc. are difficult to calculate with exactitude beforehand as it is uncertain how great the production load will be for each turbine.

Although the present invention has been described primarily with reference to a plant for the generation of energy from low velocity water currents, it should be pointed out that the mooring arrangement is suitable for any floating structure which, because of its design, is subjected to substantial trimming moments. The mooring arrangement should thus not be limited to structures with pontoons 610, and nor to rectangular or primarily elongate structures.

The invention claimed is:

1. An arrangement for anchoring a floating structure comprising first and second ends, characterised in that:
at each of said ends the structure is provided with at least one downwardly projecting rigid mooring boom;
the mooring boom that is connected to the first end of the structure comprises, at its free end, means for guiding an elongated mooring element which at one end thereof is connectable to the second end of the structure;
the mooring boom that is connected to the second end of the structure comprises, at its free end, means for guiding an elongate mooring element which at one end thereof is connectable to the first end of the structure; and
whereby at least one of said rigid mooring booms disposed along the first and second ends of the structure further comprise telescoping elements which permit compression and extension of said rigid mooring boom.

2. An arrangement according to claim 1, characterised in that each mooring boom is pivotally attached to the floating structure.

3. An arrangement according to claim 1, characterised in that each respective first and second elongated mooring element is attached to respective points of attachment at the second and first ends of the structure.

4. An arrangement according to claim 1, characterised in that each of the said means for guiding elongate mooring elements is a sleeve, pivotally attached to said respective mooring boom.

5. An arrangement according to claim 1, characterised in that the elongate mooring elements are slidably arranged in association with said means for guidance.

6. An arrangement according to claim 1, characterised in that the structure is supported by a plurality of float elements arranged in pairs and projecting out from the structure.

7. An arrangement according to claim 1, characterised by tensioned lines which connect the free end of a mooring boom to the first and second ends of the floating structure.

8. An arrangement according to claim 7, characterised in that said pairs of tensioned lines connect the free ends of the mooring booms to respective said float elements.

9. An arrangement according to claim 1, characterised in that the arrangement comprises a plurality of supporting arms which at one of the their ends are pivotally attached to the structure, and at their other end are attached to a generator for generation of energy from water currents.

10. An arrangement according to claim 1, characterised in that each mooring element is equipped with stop means between respective guiding means and respective anchoring points on a bottom below the arrangement.

11. An arrangement according to claim 1 wherein said float elements project out from the structure at the first and second ends.

12. An arrangement for anchoring a floating structure comprising first and second ends, characterised in that:
at each of said ends the structure is provided with at least one downwardly projecting rigid mooring boom;
the mooring boom that is connected to the first end of the structure comprises means for guiding an elongated mooring element which at one end thereof is connected to the second end of the structure;
the mooring boom that is connected to the second end of the structure comprises means for guiding an elongate mooring element which at one end thereof is connected to the first end of the structure; and
whereby tensioned lines connect mooring booms to the first and second ends of the floating structure.

13. An arrangement according to claim 12, characterised in that each mooring boom is pivotally attached to the floating structure.

14. An arrangement according to claim 12, characterised in that each mooring boom comprises telescopic elements which permit a compression and an extension of said mooring boom.

15. An arrangement according to claim 12, characterised in that each respective first and second elongated mooring element is attached to respective points of attachment at the second and first ends of the structure.

16. An arrangement according to claim 12, characterised in that each of the said means for guiding elongate mooring elements is a sleeve, pivotally attached to said respective mooring boom.

17. An arrangement according to claim 12, characterised in that the elongate mooring elements are slidably arranged in association with said means for guidance.

18. An arrangement according to claim 12, characterised in that the structure is supported by a plurality of float elements arranged in pairs and projecting out from the structure.

19. An arrangement according to claim 12, characterised in that the tensioned lines connect free ends of the mooring booms to said float elements.

20. An arrangement according to claim 12, further comprising a plurality of supporting arms which at one of the their ends are pivotally attached to the structure, and at their other end are attached to a generator for generation of energy from water currents.

21. An arrangement according to claim 12, characterised in that each mooring element is equipped with stop means.

22. An arrangement according to claim 18 wherein said float elements project out from the structure at the first and second ends.

* * * * *